United States Patent Office 3,116,112
Patented Dec. 31, 1963

3,116,112
PREPARATION OF SODIUM HYDRIDE
Herbert Jenkner, Hannover-Wulfel, Germany, assignor to Kali-Chemie Aktiengesellschaft, Hannover, Germany
No Drawing. Filed Jan. 29, 1960, Ser. No. 5,371
Claims priority, application Germany Jan. 31, 1959
2 Claims. (Cl. 23—204)

The invention relates to the preparation of sodium hydride.

It is known to prepare sodium hydride by reacting sodium and hydrogen under atmospheric pressure at elevated temperatures of about 200 to 350° C., whereby the sodium metal may be applied suspended in a high boiling liquid. In order to increase the rate of hydrogen take up during the hydrogenation, various organic substances such as sebacic or abietic acid, may be added. Nonetheless, the reaction remains a rather slow process.

I have found that the rate of the sodium hydride formation at said temperatures may be considerably increased when the sodium is activated by the addition of potassium. Small amounts of less than 1 mol percent, for instance 0.2 percent, are already effective in producing a noticeable increase in the rate of hydrogen take up. I prefer to add 1 to 10 mol percent of potassium, calculated on the mole amount of sodium present.

Instead of metallic potassium, solid anhydrous potassium hydroxide may be used in the same mol amounts as the potassium itself. Potassium hydroxide has not quite the same activating effect as the metallic potassium but has the advantage of being considerably cheaper.

It appears that the rate of hydrogenation of sodium is increased by the addition of any alkali metal having a higher atomic number than sodium. Caesium and rubidium, and their hydroxides, have a similar effect as potassium but will hardly be used because of their prohibitive cost. Lithium, on the other hand, has no effect.

The reaction is preferably carried out in a high boiling dispersing liquid, for instance, high boiling mineral or paraffin oils which are free of unsaturated compounds. The suspension has to be stirred or agitated to ensure a smooth progress of the reaction.

Air and moisture should be excluded from the reactants. It is desirable to carry out the reaction in an atmosphere consisting essentially only of hydrogen though the presence of inert gases such as nitrogen, argon, and the like is not harmful.

The following examples are given to illustrate the invention.

*Example 1*

A suspension of 24 g. of sodium and 2.5 g. of potassium in 500 g. of paraffin oil was slowly heated in a closed reacttion vessel to 290° C. with stirring. Into said heated suspension, hydrogen was introduced under atmospheric pressure. The hydrogen was taken up by the sodium with formation of sodium hydride, at a rate of 2 liters of hydrogen within 5 minutes.

If the test was repeated under the same conditions of temperature and rate of admission of hydrogen, but omitting the potassium, a time of 15 minutes was required to take up 2 liters of hydrogen.

*Example 2*

5 g. of potassium hydroxide were added to a suspension of 24 g. of sodium in 300 g. of paraffin oil with stirring, whereupon the mixture was heated with further stirring to 290° C. Then hydrogen was introduced at said temperature into the mixture, whereby two liters of hydrogen per six minutes were taken up.

The obtained sodium hydride contains potassium hydride which, however, generally need not be removed because, in most cases, it will not affect the usefulness of the sodium hydride for the purposes to which the latter is applied.

I claim:

1. A method of converting sodium substantially completely into sodium hydride comprising introducing hydrogen at substantially atmospheric pressure into a suspension of metallic sodium and 0.2 to 10 percent by moles of a member of the group consisting of potassium and potassium hydroxide, calculated on the mole amount of sodium, in a high boiling inert dispersing liquid, and heating said suspension with stirring at a temperature of about 200 to 350° C. until the absorption of hydrogen is substantially terminated.

2. The method as claimed in claim 1 wherein said dispersing liquid is a mineral oil having a boiling point between about 250 and 400° C.

References Cited in the file of this patent

UNITED STATES PATENTS

| | | |
|---|---|---|
| 1,958,012 | Muckenfuss | May 8, 1934 |
| 2,448,262 | Gilbert | Aug. 31, 1948 |
| 2,864,761 | D'Ouville et al. | Dec. 16, 1958 |

FOREIGN PATENTS

| | | |
|---|---|---|
| 483,406 | Great Britain | Apr. 30, 1938 |

OTHER REFERENCES

Sittig: "Sodium," 1956, page 64.